April 24, 1934.  W. O. THEWES  1,956,182
THREAD CUTTING DEVICE
Filed May 6, 1931   2 Sheets-Sheet 1
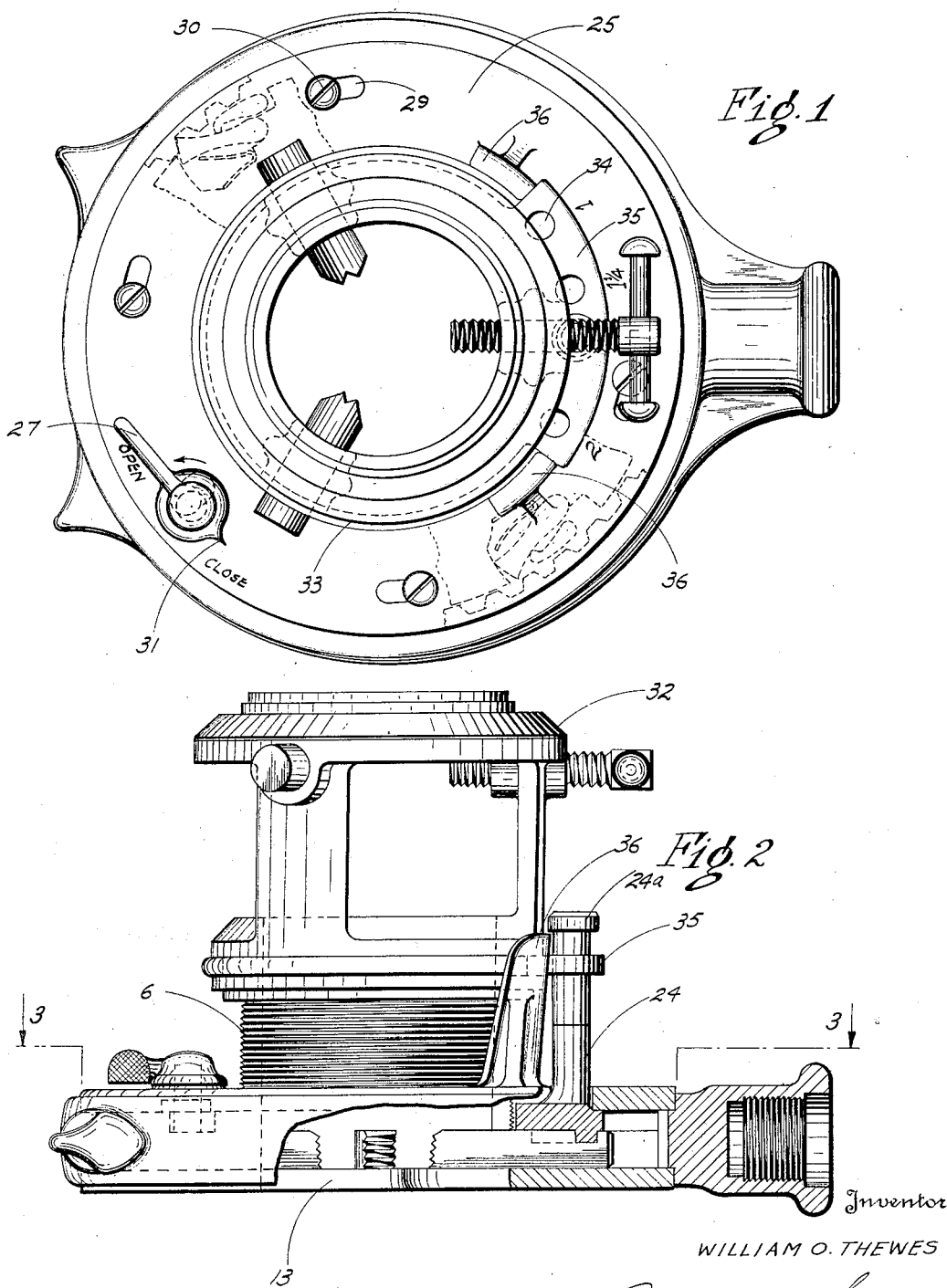

April 24, 1934.  W. O. THEWES  1,956,182
THREAD CUTTING DEVICE
Filed May 6, 1931   2 Sheets-Sheet 2
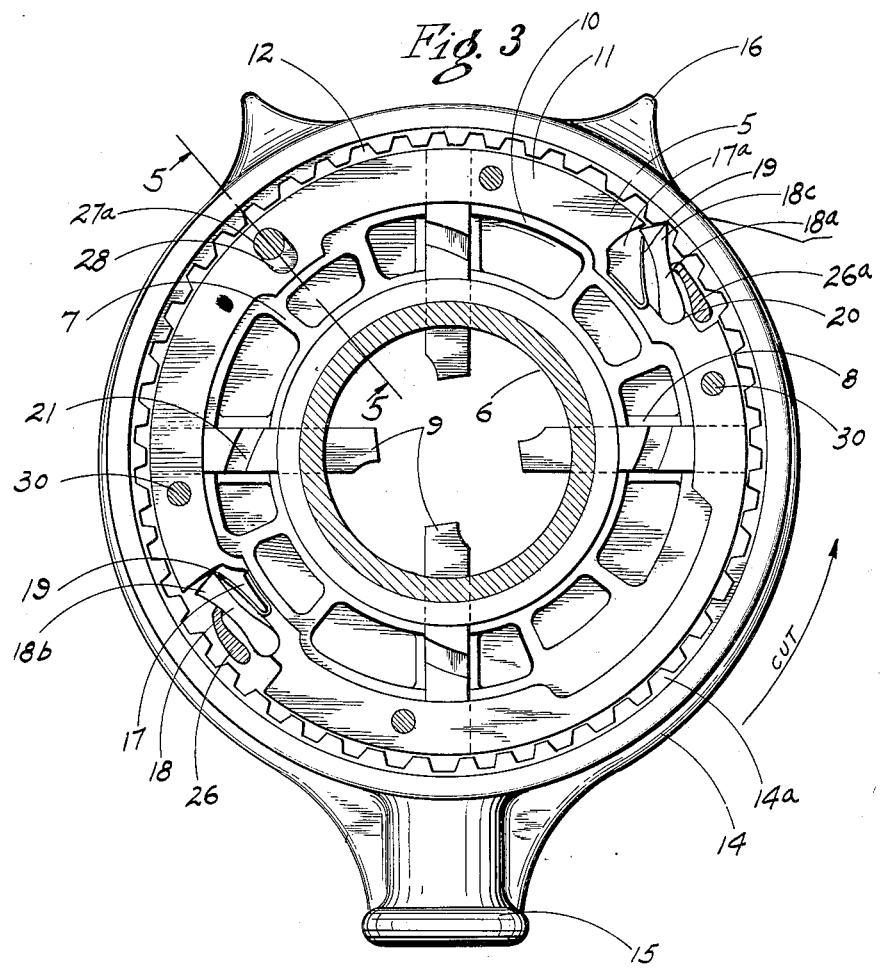
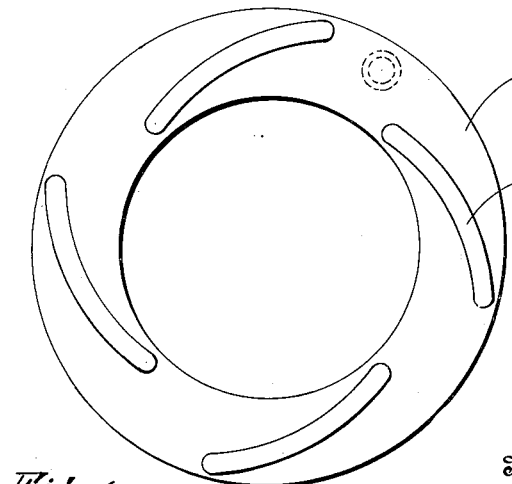
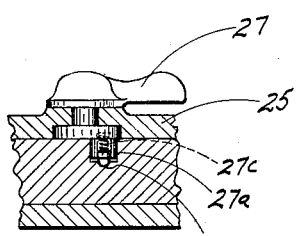
Inventor
WILLIAMS O. THEWES
By Richey & Watts
Attorneys Patented Apr. 24, 1934

1,956,182

UNITED STATES PATENT OFFICE 1,956,182

THREAD CUTTING DEVICE

William O. Thewes, North Ridgeville, Ohio, assignor to The Ridge Tool Company, North Ridgeville, Ohio, a corporation of Ohio Application May 6, 1931, Serial No. 535,437

14 Claims. (Cl. 10—124)

This invention relates to thread cutting devices and has for its principal object to provide a device of this class which is relatively simple in construction and efficient in operation and which may be quickly and easily adjusted to cut threads of varying diameters, the chasers being readily adjustable removable and replaceable and the parts being constructed in such manner that they may be readily assembled and disassembled, and furthermore most of the parts may be die-cast to close limits, to thereby reduce machining to a minimum, enabling the threader as a whole to be manufactured at a relatively low cost.

With the foregoing and other objects and advantages in view, the invention consists in the preferred construction and arrangement of the several parts which will be more fully hereinafter described and claimed.

In the drawings:

Fig. 1 is a view in top plan of a thread cutter constructed in accordance with the features of invention;

Fig. 2 is a view principally in side elevation, parts being broken away and shown in section;

Fig. 3 is a view taken substantially on the line 3—3, Fig. 2, the cam and drive plates being removed;

Fig. 4 is a bottom plan view of the cam plate; and

Fig. 5 is a sectional view taken on the line 5—5, Fig. 3.

The reference numeral 5 generally designates a carrier plate which has projecting concentrically therefrom an exteriorly threaded barrel 6. The plate and barrel are preferably formed as an integral unit and may be die-cast from suitable metal to relatively close limits and the threads then cut on the barrel.

The base of this plate structure is formed with a series of radial strengthening ribs 7 and chaser-holding ribs 8, the chasers, indicated at 9, being mounted in radial guide slots formed in the plate at the base of the barrel and in the circumferential portion of the plate, said slots being connected by the ribs 8. The ribs 7 and 8 merge at their outer ends into an inner reduced portion 10 of an annular peripheral wall 11.

The annular wall 11 of the plate has formed on the periphery thereof an annular projecting flange 13, see Fig. 2, and a drive ring 14, Fig. 3, formed with teeth 14a, is adapted to be positioned on said flange around said wall with its teeth 14a, having free relative movement with respect thereto, said ring being formed with an interiorly-threaded handle socket 15 and feet 16.

The wall 11 is formed with housing openings 17 and 17a at spaced portions therearound, and in these housings are mounted ratchet assemblies comprising dogs 18 and 18a and springs 19, the dogs being formed with toothed portions 18b and 18c at one end adapted to have one-way engagement with the teeth 14a of the drive ring 14, the opposite end of each dog being rounded and having bearing in a seat 20 formed in the wall 11.

The tooth 18c of dog 18a moves into mesh with one of the teeth 14a when the chasers are closed and the drive ring is rotated in a cutting direction, as indicated by the arrow in Fig. 3, and the tooth 18b of dog 18 engages with one of said teeth when the chasers are opened and the said ring is rotated in a reverse direction, as will be presently apparent. It will be observed that the manner in which these dogs are positioned with respect to the driving ring ensures that the driving force or pressure will be transmitted in a straight line through the dogs to the reinforced wall 11, a construction which is practically unbreakable yet permits the utilization of relatively light parts.

The chasers 9 are formed with cam grooves 21, in which cams 22, provided on the under surface of a cam plate 23, have movement. The cam plate 23 rests on the annular ledge or shelf 10 formed on the wall 11 and has a snug movable fit with respect to the inner surface of said wall. This cam plate may also be manufactured by die-casting and is provided with an index pin or post 24, see Fig. 2 for a purpose to be described.

After the cam plate has been positioned in the carrier plate, a drive plate, generally indicated at 25 in Fig. 1 is fitted into the drive ring 14 and rests on the annular ledge formed by the teeth 14a of said ring. This drive plate is provided with cam pins 26 and 26a which project from the under-surface thereof into the housings 17 and 17a and are adapted to bear against the dogs 18 and 18a. Fig. 3 shows these pins in section with the plate removed. A thumb lever 27, note particularly Fig. 5, provided with an eccentric pin or post 27a, is mounted on and has bearing in the drive plate 25, with its pin 27a engaging in a slot 28 formed in the wall 11 of the carrier plate 5. The pin or post 27a is provided with a spring 27c and ball 27d, said ball engaging in a detent 27d when the lever is turned to closed position, preventing accidental displacement of the chasers.

The drive plate is formed with a series of slots 29 through which headed securing screws 30 are passed. These screws are formed with annular shouldered portions which fit in said slots while the threaded portion of each screw is threaded into the wall 11 of the carrier plate 5, note Fig. 3. The drive plate 25 is thus secured to the wall 11 of the carrier plate 5 while at the same time being permitted to have limited relative movement with respect to said plate when the lever 27 is turned to move the eccentric 27a in the slot 28. The lever 27 is provided with a pointer or indicator 31 which cooperates with suitable indicia on the surface of the drive plate 25 to indicate when the chasers are in open and closed position. This lever serves to advance and retract the chasers 9 and simultaneously reverse the positions of the pawls 18 and 18a and consequently reverse the drive.

Mounted on the barrel 6 is a work-holder generally indicated at 32. The work-holder is described and claimed in my co-pending application, Serial No. 546,711, filed June 25, 1931, and forms no part of the present invention.

Mounted for relative turning movement on the lower extremity of the work-holder 32 is a ring 33 formed with openings 34 in an annularly flared or enlarged portion thereof which constitutes a change plate or dial 35. This flared portion or plate 35 fits in between two uprights which constitute guides 36 formed on the drive plate 25 so that relative angular movement between the ring 33 and plate 25 is prevented. The index pin or post 24 on the cam plate 23 projects upwardly through any one of the openings 34, according to the adjustment of the chasers 9, and is provided with a screw cap 24a. The drive plate 25 is preferably calibrated adjacent the openings in the change plate 35, thus providing a dial indicating the diameters of the threads which may be cut by adjusting the index pin or post 24 in the said openings. The opposed parallel faces of the guides 36 are inclined with respect to the vertical axis of the cam plate, for a purpose to be described.

When it is desired to adjust the chasers 9 to different diameters of threads, the cap 24a may be removed from the index pin or post 24, the work-holder unscrewed to raise the change plate clear of the post and the latter then adjusted to the desired diameter of threads as indicated on the dial on the drive plate 25. This action ensues due to the fact that the position of the cam plate 23 is adjusted angularly relatively to the carrier plate 5 and drive plate 25, thus changing the position of the cams 22 in the chaser grooves 21 and advancing or retracting the chasers according to the desired adjustment. When it is desired to remove the chasers, the index pin or post 24 may be moved to the extreme left position as shown in Fig. 1, thereby moving the cams 22 clear of the chaser grooves, and the drive ring moved clear of the chasers and the latter removed outwardly.

The general operation of the device will be apparent in view of the foregoing description taken in conjunction with the drawings. Adjacent the thumb screw 27 the drive plate is preferably marked "open" and "close". When the indicator 31 points to the word "close" the chasers have been closed on the work and the cam pin 26 has been shifted against the dog or pawl 18, holding the latter clear of the teeth 14a of the drive ring 14, while the cam pin 26a has been shifted clear of the pawl 18a, permitting the latter to engage said teeth. The device is then ready for the cutting operation. When it is desired to back the device off of the cut threads, the indicator may be turned to the word "open", thus opening the chasers and moving the pawl 18 to engage said teeth.

The chasers are advanced and retracted simultaneously with the change on the drive, due to the fact that the eccentric 27a not only shifts the positions of the pawls 18 and 18a but also causes relative angular movement between the cam plate 23 and carrier plate 5. Thus when backing the device off of the cut threads, the chasers are opened or retracted slightly, thereby minimizing the chances of chipping of the chasers and mutilation of the threads.

The work-holder 32 operates in a manner as described in my copending application heretofore specified. This holder is first clamped on the pipe or object to be threaded. The device may then be positioned adjacent the end of the pipe with the barrel 6 partly threaded into the holder 32. As the drive ring 14 is turned during the cutting operation, the barrel and cutter assembly is advanced into the holder.

The uprights 36 are preferably inclined in the same direction as heretofore specified, so that as the barrel advances into the holder, the change plate 35 is slightly rotated, thus slightly retracting the chasers or dies 9 as the thread-cutting operation progresses and forming the usual tapered thread on the pipe.

It will be noted that the device permits the use of gang cutters having substantially straight thread cutting end faces, so that a plurality of chasers may be sharpened simultaneously. A further advantage in making the end faces of the chasers or dies substantially straight is that the latter are better adapted to thread pipes of varying diameters and are not subject to the limitations of dies having curved end faces.

The carrier plate, cam plate and drive plate may each be manufactured by die-casting to close limits, reducing machining costs to a minimum, and the manner in which the pawls or dogs 18 and 18a are positioned with respect to the wall 11 of the carrier plate 5 so as to absorb the driving force to the best advantage, permits the use of relatively light parts suitable for die-casting.

I claim:

1. A thread cutter comprising a carrier plate, a drive ring mounted around said plate and formed with a series of internal teeth, reversely acting spring-pressed pawls mounted in said carrier plate and having one-way engagement with said teeth, and a drive plate mounted for relative movement with respect to said carrier plate and provided with cam pins adapted to engage said pawls to reverse the driving engagement thereof with said teeth when the chasers are moved to open and closed position.

2. In a thread cutting device, a carrier plate formed with housings, a drive ring formed with teeth on the internal surface thereof mounted on said carrier plate, reversely acting spring-pressed pawls mounted in said housings, and a drive plate provided with cam pins extending into said housings and adapted to contact with said pawls to alternately hold the latter in released position.

3. In a thread cutting device, a carrier plate and drive ring mounted in cooperative position with said plate, said drive ring being formed with teeth on the internal surface thereof, reversely acting pawls mounted in said carrier plate and adapted to engage said teeth, said pawls being formed in one piece and receiving and transmitting the driving force exerted by the drive ring in a straight line longitudinally thereof to the carrier plate.

4. In a thread cutting device, a carrier plate provided with housings in the peripheral portion thereof, said housings being formed with seats, reversely acting pawls mounted in said housings with the ends thereof resting in said seats, a drive ring mounted to cooperate with said carrier plate, said ring being formed with teeth adapted to engage with said pawls, a drive plate provided with cam pins projecting into said housings, and means for moving said drive plate relatively to said carrier plate, said cam pins alternately engaging said pawls during such relative movement for reversing the driving engagement thereof with the teeth of the drive ring.

5. A thread cutting device comprising a carrier plate formed with a series of radially extending grooves in the base thereof, chasers mounted in said grooves, said chasers being formed with arcuate grooves, a toothed drive ring mounted on said carrier plate, said carrier plate being formed with housings in the peripheral portion thereof, pawls seated in said housings and adapted to engage the teeth of said drive ring, a cam plate mounted on said carrier plate and provided with cams on the under surface thereof adapted to engage in the grooves of said chasers, and a drive plate mounted on said carrier plate and provided with cam pins adapted for contact with said pawls, said cam plate being provided with an eccentric lever adapted to engage in said carrier plate, relative movement being initiated between said drive plate and carrier plate by turning said lever whereby said pawls are alternately moved into engagement with said teeth and said chasers are moved to open and closed position.

6. In a thread cutting device, a carrier plate, chasers mounted for radial movement in said carrier plate, an internally toothed drive ring mounted on said carrier plate, and reversely acting pawls mounted in the peripheral portion of said carrier plate and adapted to engage the teeth of said ring, each of said pawls being formed in one piece and normally urged outwardly at one extremity and seated at its opposite extremity in a bearing seat formed in said plate.

7. In a thread cutting device, a carrier plate, chasers mounted for radial movement in said plate, said chasers being formed with cam grooves in the body portion thereof, a cam plate formed with cams adapted to engage in said cam grooves, a drive ring mounted on said carrier plate, a drive plate mounted on said drive ring, means for establishing a one-way driving connection between said carrier plate and said drive ring, and means on said drive plate for initiating relative movement between said drive plate, cam plate and carrier plate, whereby said chasers are moved into and out of engagement with the work and said driving connection is reversed.

8. A thread cutting device comprising a carrier plate formed with a series of radially extending grooves in the base thereof, chasers mounted in said grooves, a drive ring mounted on said carrier plate, ratchet mechanism for establishing a drive connection between said plate and ring, and means for opening and closing said chasers and simultaneously reversing the drive between said plate and ring.

9. A thread cutting device comprising a carrier plate formed with a series of radially extending grooves in the base thereof, chasers mounted in said grooves, a drive ring mounted on said carrier plate, ratchet mechanism for establishing a drive connection between said plate and ring, means for opening and closing said chasers, means for reversing the drive between said plate and ring, and a unitary control for simultaneously actuating both of said means.

10. In a thread cutter, a carrier plate, chasers mounted in said plate, a cam plate for radially moving said chasers, a work holder mounted for axial movement on said carrier plate, a change plate rotatably mounted on said work holder and having a plurality of openings therein, an index pin on said cam plate for selective engagement in said openings for adjusting the chasers to various standard diameters of threads, means for holding the change plate fixed with respect to the carrier plate after the work holder has been moved axially to working position, means for moving the dies outwardly during the threading operation to provide taper to the threads being cut, and means for retracting the chasers slightly after the threading operation.

11. In a thread cutting machine, a set of chasers, a cam plate for advancing and retracting said chasers, a work holder associated with the frame of the machine and adapted to be moved axially with respect thereto, a change plate rotatably mounted on said holder and provided with a plurality of spaced chaser-adjusting apertures therein, and a post fixed to said cam plate and adapted to register selectively with said apertures when said holder is moved axially into working position with respect to said frame.

12. In a thread cutting machine, a set of chasers, a cam plate for advancing and retracting said chasers, a carrier plate having a threaded projection formed thereon, a work holder threaded for axial movement on said projection, a change plate rotatably mounted on said work holder and provided with a plurality of spaced chaser adjusting apertures therein, and a post fixed to said cam plate and adapted to register selectively with said apertures when said holder is threaded into working position on said carrier plate.

13. A thread cutter comprising a carrier plate, a drive ring, said plate and ring being provided with coacting ratchet mechanism consisting of teeth and opposed spring-pressed pawls adapted for one-way engagement with said teeth, and drive-reversing cam devices adapted for simultaneous alternate tooth-releasing engagement with said pawls.

14. A thread cutter comprising a carrier plate, thread-cutting chasers associated with said plate, means for opening and closing said chasers, a drive ring, said plate and ring being provided with co-acting ratchet mechanism consisting of teeth and opposed spring-pressed pawls adapted for one-way engagement with said teeth, and drive-reversing cam devices controlled by the means for opening and closing said chasers adapted for simultaneous alternate tooth-releasing engagement with said pawls.

WILLIAM O. THEWES.